J. D. SEAMANS.
POULTRY FEEDER.
APPLICATION FILED APR. 17, 1916.
1,195,104.
Patented Aug. 15, 1916.
2 SHEETS—SHEET 2.
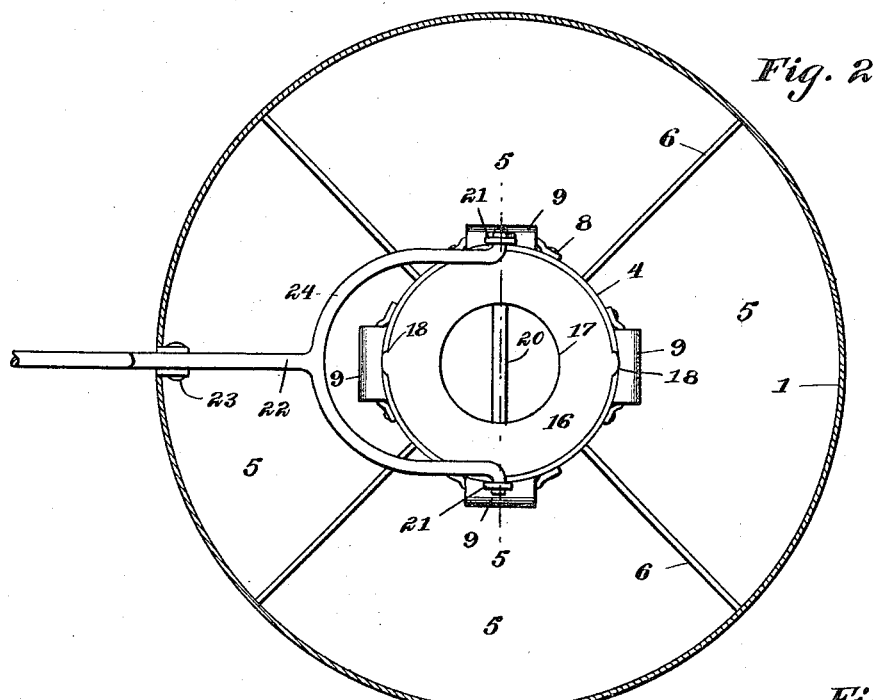
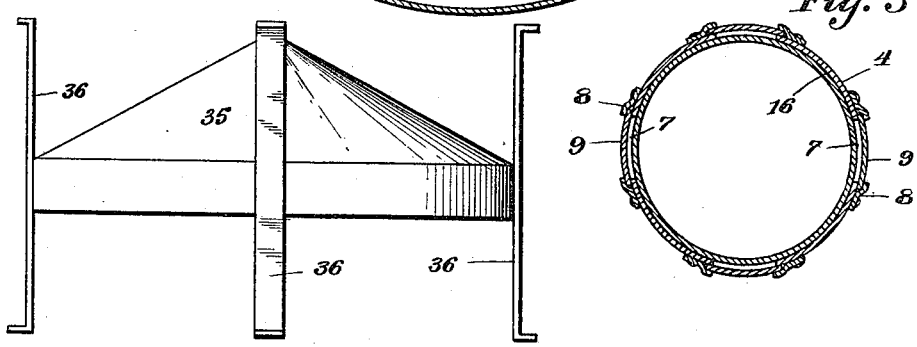
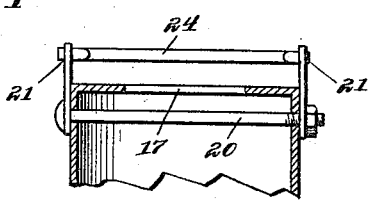
Inventor
J. D. Seamans,

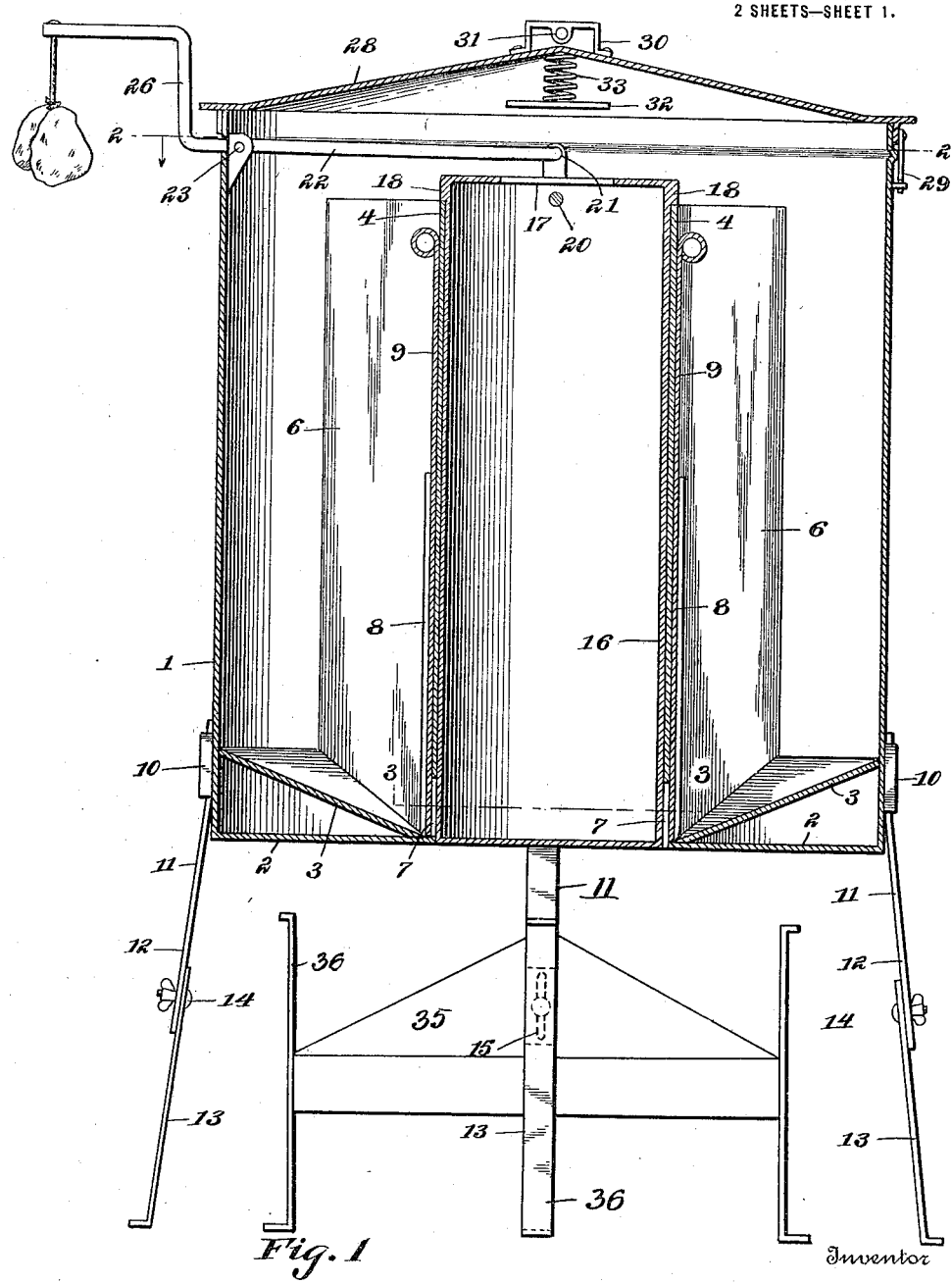

UNITED STATES PATENT OFFICE.

JOHN D. SEAMANS, OF GREENVILLE, TEXAS.

POULTRY-FEEDER.

1,195,104.  Specification of Letters Patent.  Patented Aug. 15, 1916.

Application filed April 17, 1916. Serial No. 91,695.

*To all whom it may concern:*

Be it known that I, JOHN D. SEAMANS, a citizen of the United States, residing at Greenville, in the county of Hunt and State of Texas, have invented new and useful Improvements in Poultry-Feeders, of which the following is a specification.

This invention is an improved poultry feeder, the object of the invention being to provide an improved machine of this character which is operated by a lever when the chicken pecks at a bait suspended from the lever and causes feed to be automatically discharged when the lever is thus operated so that feed is supplied by the machine, only when desired and in the quantities required by the poultry and waste of the feed is prevented.

The invention consists in the features of construction, combination, and arrangement of devices, hereinafter fully described and claimed.

In the accompanying drawings:—Figure 1 is a vertical sectional view of a poultry feeding machine constructed and arranged in accordance with my invention. Fig. 2 is a horizontal sectional view of the same on the plane indicated by the line 2—2 of Fig. 1. Fig. 3 is a similar view on the plane indicated by the line 3—3 of Fig. 1. Figs. 4 and 5 are detail views.

In the embodiment of my invention, I provide a cylindrical body or vessel 1 which is provided with a flat bottom 2, and also with a funnel shape false bottom 3. The body is preferably made of galvanized sheet iron but may be made of any other suitable material. In the center of the body is a cylindrical wall 4 which extends down through a central opening in the bottom and false bottom, and is open at its upper and lower ends. The vessel or body 1 is divided into bins or compartments 5 for the reception of various kinds of feed, by means of radial partitions 6. The cylindrical wall 4 is provided at the lower end with feed discharge openings 7, for the respective bins or compartments 5 and is also provided with vertically arranged guides 8 and with vertically movable valves or slides 9 which may be raised slightly to uncover the openings 7 and permit the discharge of feed from the bins or compartments and may be closed to prevent such discharge.

On the outer side of the body, near the bottom thereof, are socket pieces or straps 10 for the reception of the upper ends of supporting legs 11. Each supporting leg comprises upper and lower sections, 12, 13, which are detachably connected to by means of bolts 14, the said bolts passing through openings in the sections 12 and operating in slots 15 with which the lower sections 13 are provided. Hence the body may be supported by the legs at any desired height above the ground.

A cylindrical valve 16 is arranged for vertical movement in the cylindrical wall 4 and when lowered, serves to cut off the feed discharge openings 7. The valve 16 is hollow and may be weighted to any desired extent by placing material therein, through an opening 17, in the upper end thereof. Said valve is provided with stops 18 to bear on the upper end of the tubular wall 4 and limit the downward movement of said valve. A bolt 20 passes transversely through the upper portion of the cylindrical valve and a pair of links 21 have their lower ends pivotally connected to said bolt. An operating lever 22 is fulcrumed in a bearing 23 in one side of the vessel 1, at its upper end and the inner end of said lever is bifurcated to form fork arms 24 to which the upper ends of the links 21 are pivotally connected. The outer portion of the lever 22 projects outwardly from the vessel or body 1 and has an upwardly extending offset 26. A suitable bait 27 is attached to and suspended from the outer end of the lever and may be reached by a fowl and may be arranged at any desired height above the ground. The weight in the cylindrical valve 16 serves to very slightly more than counterbalance the bait and the leverage of the lever, so that said valve 16 is normally in lowered, closing position. When a chicken or other fowl jumps from the ground and pecks the bait and in so doing draws on the bait, the lever serves to momentarily raise the valve 16, and assuming that one or more of the valves 9 have been opened, feed is discharged through the openings 7 and drops through the central opening in the bottom of the vessel as will be understood. Hence the feed is distributed by the machine only when the valve is operated by one of the chickens and waste of the feed is thereby prevented.

A cover 28 is provided for the vessel 1, is detachably fitted thereon and is secured, when desired by means of hooks 29. The cover is conical in form as here shown and is provided at the center with a handle 30. Said handle has an eye 31 at the center, for the attachment of a core or chain if it be desired to suspend the feeder from the limb of a tree or other overhanging object instead of supporting it above the ground by means of the legs. A buffer disk 32 is arranged under the center of the cover and is connected to the center of the cover by means of a coiled spring 33. This spring and buffer disk coact to bear downwardly on the upper end of the valve 16 at the end of each upstroke of the valve, so that said spring serves by the rebound to force the valve 16 back to its normal lowered closing position.

I also provide a feed spreader and collector 35, which is conical in form and is provided with supporting legs 36 which extend upwardly and also extend downwardly therefrom. When this device is arranged with its apex uppermost, and under the feeder, it serves to readily spread and distribute the feed, as will be understood. When said device is reversed, it serves to collect and hold the feed and the chickens are required to eat out of said spreader and collector as will be understood.

Having described the invention, what is claimed is:

1. In a poultry feeder, a body having a funnel shaped bottom, a tubular wall in the central portion of the body open at the lower end and having a feed discharge opening, a cylindrical valve arranged for vertical movement in said vertical wall to cover and uncover said feed discharge opening, a lever mounted at one side of the body and having fork arms at its inner end connected to the upper end of said valve, said valve counterbalancing said lever, a cover for the body, a buffer spring depending from the cover and a buffer disk carried by said spring and arranged above the valve and cleared by the fork arm of the lever when the valve is raised so that said disk is adapted to bear downwardly on the valve.

2. In combination with a poultry feeder to drop feed, a combined spreader and collector comprising a hollow conical member open at the base and supporting legs to support said member above the ground with either its conical or open side uppermost.

In testimony whereof I affix my signature.

JOHN D. SEAMANS.

Copies of this patent may be obtained for five cents each, by addressing the "Commissioner of Patents, Washington, D. C."